United States Patent
Huang et al.

(10) Patent No.: US 8,310,827 B2
(45) Date of Patent: Nov. 13, 2012

(54) STRAP MECHANISM FOR DRAWING AN ELECTRONIC DEVICE FROM A CAGE

(75) Inventors: Hsiang-Wen Huang, Taipei Hsien (TW); Ta-Wei Chen, Taipei Hsien (TW); Fu-Lung Lu, Taipei Hsien (TW); Chia-Hsin Hsieh, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 175 days.

(21) Appl. No.: 12/840,309

(22) Filed: Jul. 21, 2010

(65) Prior Publication Data
US 2011/0032665 A1    Feb. 10, 2011

(30) Foreign Application Priority Data

Aug. 4, 2009  (TW) .............................. 98126182 A

(51) Int. Cl.
H05K 7/16  (2006.01)
G06F 1/16  (2006.01)

(52) U.S. Cl. ......... 361/679.37; 361/679.31; 361/379.33; 361/679.39; 312/223.2; 720/657

(58) Field of Classification Search ............ 361/679.02, 361/679.31–679.39, 679.58, 724–727; 312/223.1–223.2; 720/657
See application file for complete search history.

(56) References Cited

U.S. PATENT DOCUMENTS 5,262,923 A * 11/1993 Batta et al. ............... 361/679.37
5,520,069 A *  5/1996 Rynders et al. ................. 74/520
6,351,379 B1 *  2/2002 Cheng ...................... 361/679.33
6,600,648 B2 *  7/2003 Curlee et al. ............. 361/679.34
6,633,486 B2 * 10/2003 Coles et al. .................... 361/726
6,882,526 B2 *  4/2005 Neukam et al. .......... 361/679.39
7,167,371 B2 *  1/2007 Coles et al. .................... 361/726
7,359,189 B2 *  4/2008 Chiang et al. ............ 361/679.33
7,639,490 B2 * 12/2009 Qin et al. .................. 361/679.34
7,679,896 B2 *  3/2010 Deng et al. ............... 361/679.33

(Continued)

FOREIGN PATENT DOCUMENTS
TW    574838    2/2004
(Continued)

OTHER PUBLICATIONS

Office action mailed on Aug. 9, 2012 for the Taiwan application No. 098126182, p. 2 line 7-26, p. 3-5, p. 6 line 1-18.

*Primary Examiner* — Robert J Hoffberg
(74) *Attorney, Agent, or Firm* — Winston Hsu; Scott Margo

(57) ABSTRACT

A strap mechanism for drawing an electronic device from a cage in a first direction is disclosed. The strap mechanism includes a first rail. The first rail includes a first locking part for connecting with a lateral surface of the electronic device and disposed inside the cage in a slidable manner, and a first handle part connected to an end of the first locking part. A first slot is formed on the first handle part. The strap mechanism further includes a strap. A first end of the elastic strap is inserted inside the first slot. The strap is for contacting against the first handle part so as to provide a component force in the first direction and in a second direction perpendicular to the first direction to the first handle part when a deformation of the elastic strap is generated by being pulled in the first direction.

16 Claims, 10 Drawing Sheets

U.S. PATENT DOCUMENTS

| | | | | |
|---|---|---|---|---|
| 7,755,887 B2 * | 7/2010 | Chen et al. | ............... | 361/679.33 |
| 8,064,195 B2 * | 11/2011 | Zhang et al. | .............. | 361/679.33 |
| 8,077,467 B2 * | 12/2011 | Chen et al. | .................... | 361/726 |
| 8,089,752 B2 * | 1/2012 | Xu et al. | .................. | 361/679.33 |
| 8,159,816 B2 * | 4/2012 | Chen | ........................ | 361/679.33 |
| 8,159,817 B2 * | 4/2012 | Lin et al. | .................. | 361/679.39 |
| 2002/0095971 A1 * | 7/2002 | Pawson | ........................... | 72/457 |
| 2003/0200630 A1 | 10/2003 | Feldmeyer | | |
| 2007/0035920 A1 * | 2/2007 | Peng et al. | ................... | 361/685 |
| 2008/0298005 A1 * | 12/2008 | Deng et al. | ................... | 361/684 |
| 2011/0102998 A1 * | 5/2011 | Lin et al. | .................. | 361/679.33 |
| 2011/0128695 A1 * | 6/2011 | Fang et al. | ............... | 361/679.34 |
| 2012/0104222 A1 * | 5/2012 | Ding | ............................ | 248/634 |
| 2012/0162899 A1 * | 6/2012 | Wu et al. | .................. | 361/679.33 |

FOREIGN PATENT DOCUMENTS

| | | |
|---|---|---|
| TW | M249173 | 11/2004 |
| TW | 200704344 | 1/2007 |
| WO | WO 2010032907 A1 * | 3/2010 |

* cited by examiner

STRAP MECHANISM FOR DRAWING AN ELECTRONIC DEVICE FROM A CAGE

BACKGROUND OF THE INVENTION

1. Field of the Invention

The present invention relates to a strap mechanism, and more particularly, to a strap mechanism for drawing an electronic device from a cage conveniently.

2. Description of the Prior Art

A computer capable of being disassembled easily preferably corresponds to a user's demand in order to disassemble broken components from a computer for detecting and fixing or to disassemble old-type components for updating. A storage device, such a hard disk, is a necessary apparatus of the computer. Therefore, design of assembling and disassembling the storage device conveniently is an important issue.

Please refer to FIG. 1. FIG. 1 is a schematic diagram of a removable storage device 10 in the prior art. The removable storage device 10 includes at least one electronic device 12. The electronic device 12 can be a storage device, such as a hard disk, an optical disk drive, and so on. The removable storage device 10 shown in FIG. 1 includes two electronic devices 12 disposed as a stack. The removable storage device 10 further includes a cage 14 for holding the electronic devices 12. At least one hole 141 is formed on the cage 14. The removable storage device 10 further includes at least one handle 16 connected to the electronic device 12 so as to pull the electronic device 12 out of the cage 14. A hook 18 is disposed on the handle 16 for engaging inside the opening 141 on the cage 14. When a user presses two ends of the handle 16 inward, the hook 18 can separate from the opening 141 of the cage 14 so as to pull the electronic device 12 out of the cage 14. Due to spatial limitation of the removable storage device 10, dimensions of the handle 16 is small so that the handle 16 is operated constrainedly and uncomfortably, for example, the handle 16 can not be operated by one hand easily and pains the user when the user presses the handle 16 excessively.

Please refer to FIG. 2. FIG. 2 is a schematic diagram of another removable storage device 30 in the prior art. The removable storage device 30 includes at least one electronic device 32. The electronic device 32 can be a storage device, such as a hard disk, an optical disk drive, and so on. The removable storage device 30 shown in FIG. 2 includes two electronic devices 32 disposed as a stack. The removable storage device 30 further includes a cage 34 for holding the electronic devices 32. At least one hole 341 is formed on the cage 34. The removable storage device 30 further includes at least one handle 36 connected to the electronic device 32 so as to pull the electronic device 32 out of the cage 34. A hook 38 is disposed on the handle 36 for engaging inside the opening 341 on the cage 34. Difference between the removable storage device 30 and the removable storage device 10 is that the user directly draws the handle 36 outward for pulling the electronic device 32 out of the cage 34. The removable storage device 30 has a drawback that it is difficult to disengage the hook 38 from the opening 341 on the cage 34 and the handle 36 is broken easily at a point of force application.

As mentioned above, the conventional handle of the storage device is operated uncomfortably and constrainedly, unable to be operated by one hand, and broken easily at the point of the force application. Thus, design of a removable mechanism of a removable storage device having preferred structural strength and capable of operating easily is an important issue in the computer industry.

SUMMARY OF THE INVENTION

The present invention provides a strap mechanism for drawing an electronic device from a cage conveniently for solving above drawbacks.

According to the claimed invention, a strap mechanism includes a first rail including a first locking part for connecting with a lateral surface of an electronic device and disposed inside a cage in a slidable manner, and a first handle part connected to an end of the first locking part, a first slot being formed on the first handle part. The strap mechanism further includes a strap, a first end of the strap being inserted inside the first slot, the strap being for contacting against the first handle part so as to provide a component force in a first direction and in a second direction perpendicular to the first direction to the first handle part when a deformation of the strap is generated by being pulled in the first direction.

According to the claimed invention, a removable storage module includes an electronic device, a cage for holding the electronic device, and a strap mechanism connected to the electronic device and for pulling the electronic device out of the cage in a first direction. The strap mechanism includes a first rail including a first locking part for connecting with a lateral surface of the electronic device and disposed inside the cage in a slidable manner, and a first handle part connected to an end of the first locking part, a first slot being formed on the first handle part. The strap mechanism further includes a strap, a first end of the strap being inserted inside the first slot, the strap being for contacting against the first handle part so as to provide a component force in a first direction and in a second direction perpendicular to the first direction to the first handle part when a deformation of the strap is generated by being pulled in the first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
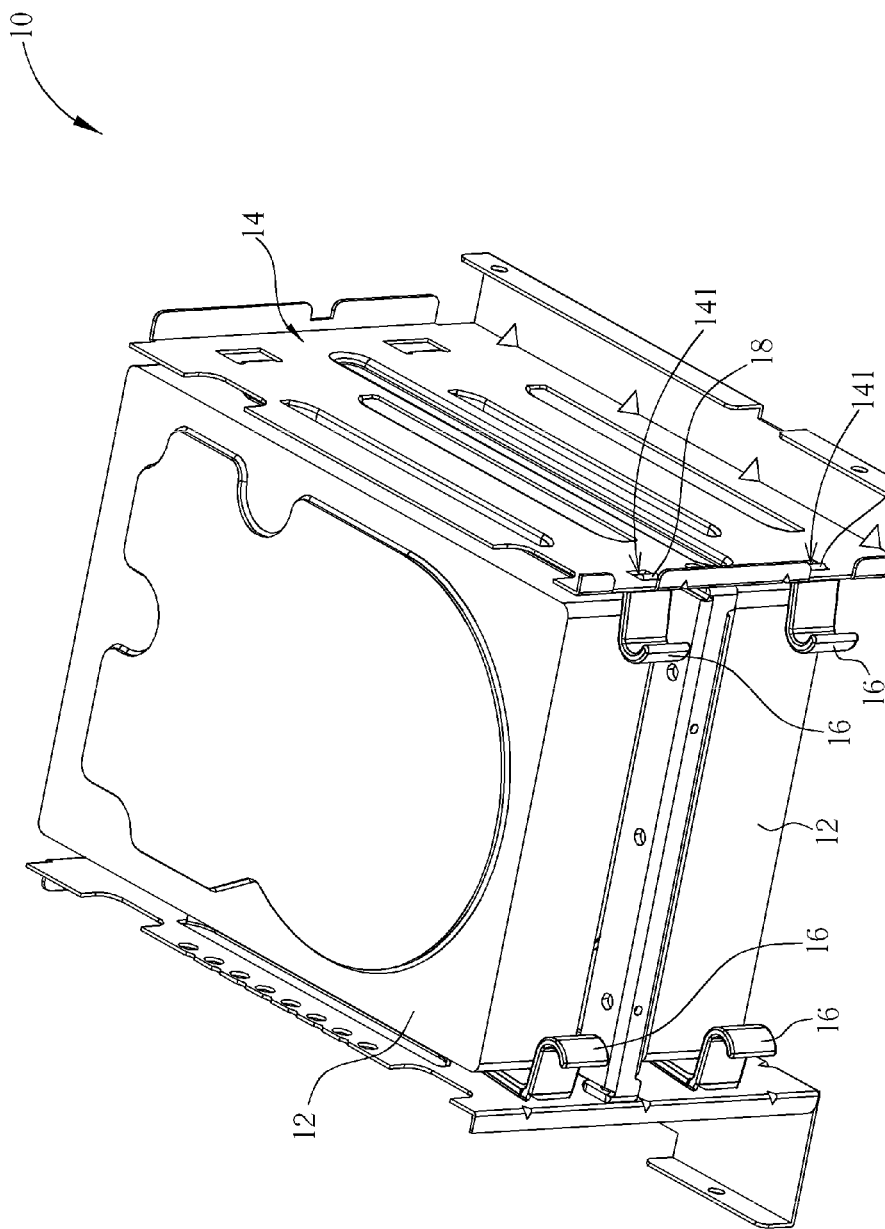
FIG. 1 is a schematic diagram of a removable storage device in the prior art.
Figure 2:
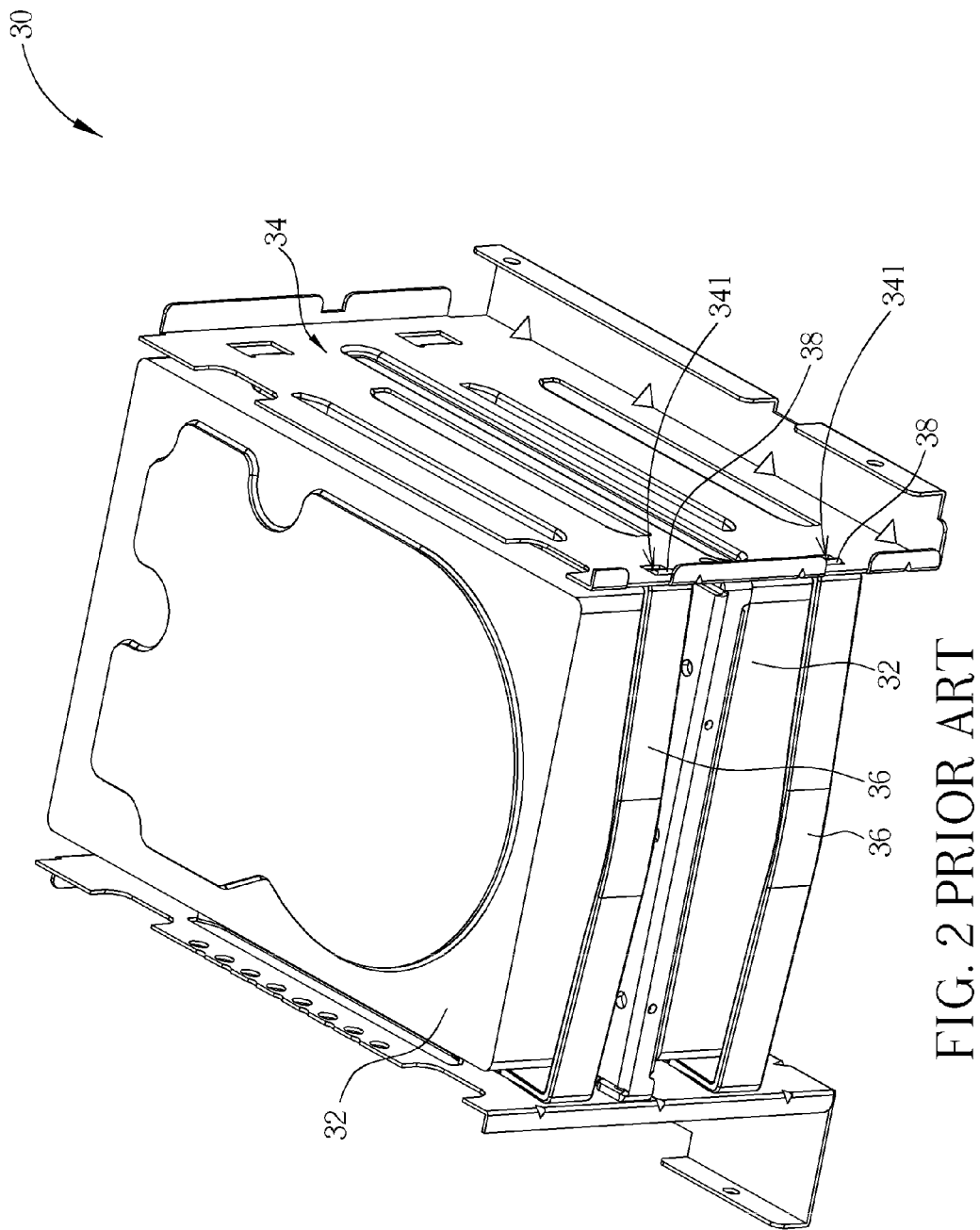
FIG. 2 is a schematic diagram of another removable storage device in the prior art.
Figure 3:
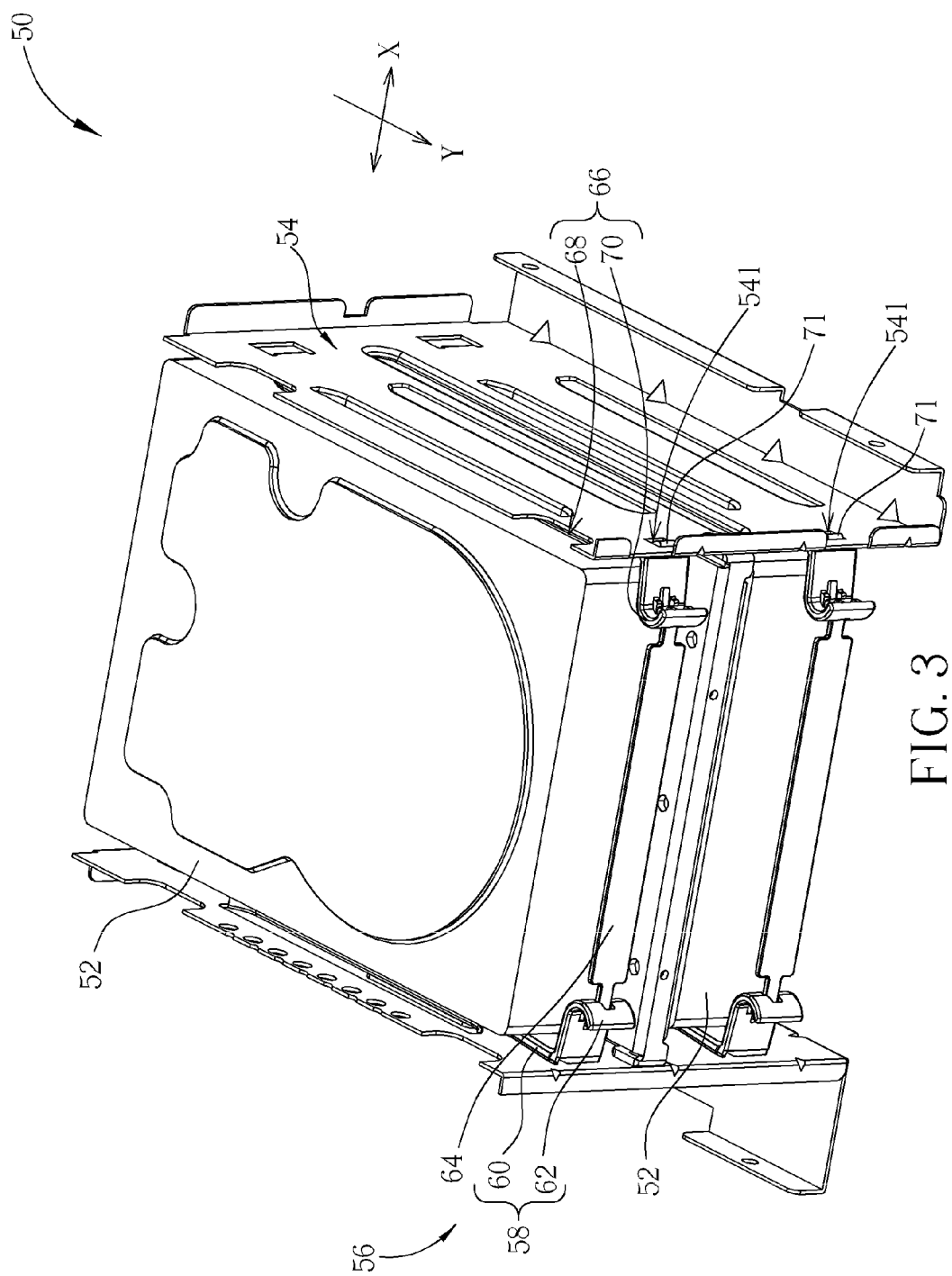
FIG. 3 is a schematic diagram of a removable storage module according to a preferred embodiment of the present invention.

Please refer to FIG. 3. FIG. 3 is a schematic diagram of a removable storage module 50 according to a preferred embodiment of the present invention. The removable storage module 50 includes at least one electronic device 52. The electronic device 52 can be a storage device, such as a hard disk, an optical disk drive, and so on. In this embodiment, the removable storage module 50 includes two electronic devices 52 disposed as a stack. Numbers and positions of the electronic device 52 are not limited to the embodiment shown in FIG. 3. The removable storage module 50 further includes a cage 54 for holding the electronic device 52. At least one opening 541 is formed on the cage 54. The removable storage module 50 further includes a strap mechanism 56 connected to the electronic device 52 and for pulling the electronic device 52 out of the cage 54 in a first direction (Y direction). The strap mechanism 56 includes a first rail 58. The first rail 58 includes a first locking part 60 for connecting with a lateral surface of the electronic device 52 and disposed inside the cage 54 in a slidable manner, and a first handle part 62 connected to an end of the first locking part 60. The first locking part 60 can be integrated with the first handle part 62 monolithically. The first locking part 60 and the first handle part 62 can further be two separated components. The strap mechanism 56 further includes a strap 64 for pulling the electronic device 52 out of the cage 54 in the Y direction. The strap 64 can be made of elastic material, such as plastic, Nylon, and so on. The strap mechanism 56 further includes a second rail 66. The second rail 66 includes a second locking part 68 for connecting with the other lateral surface of the electronic device 52 and disposed inside the cage 54 in the slidable manner, and a second handle part 70 connected to an end of the second locking part 68. The second locking part 68 can be integrated with the second handle part 70 monolithically. The second locking part 68 and the second handle part 70 can further be two separated components. The first rail 58 and the second rail 66 can be the same structural components disposed on two sides of the electronic device 52, respectively. The first rail 58 and the second rail 66 can be made of plastic material, respectively. A first end of the strap 64 is connected to the first handle part 62 of the first rail 58, and a second end of the strap 64 is connected to the second handle part 70 of the second rail 66.

Figure 4:
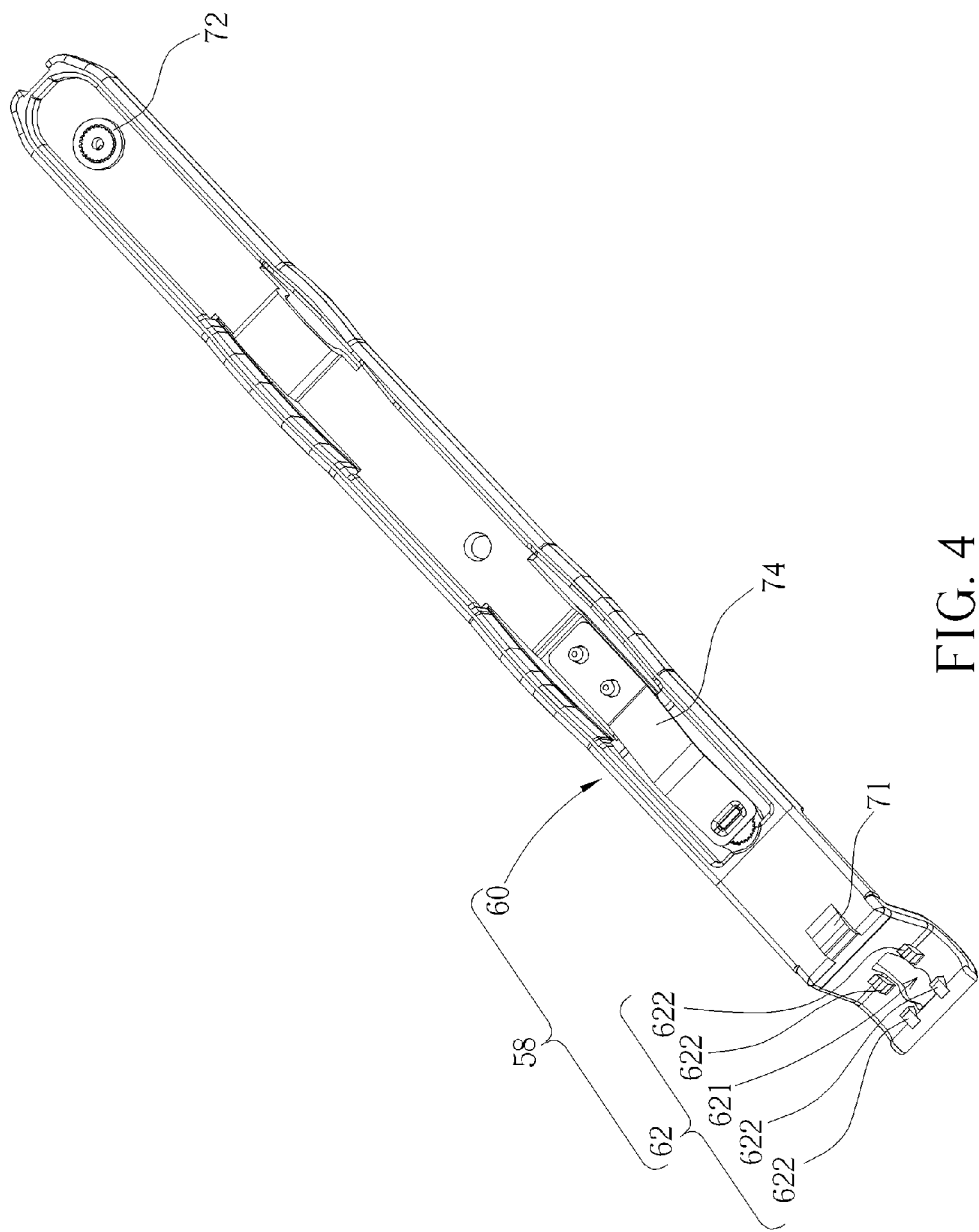
FIG. 4 is a diagram of combination of a first rail and the other components according to the preferred embodiment of the present invention.
Figure 5:
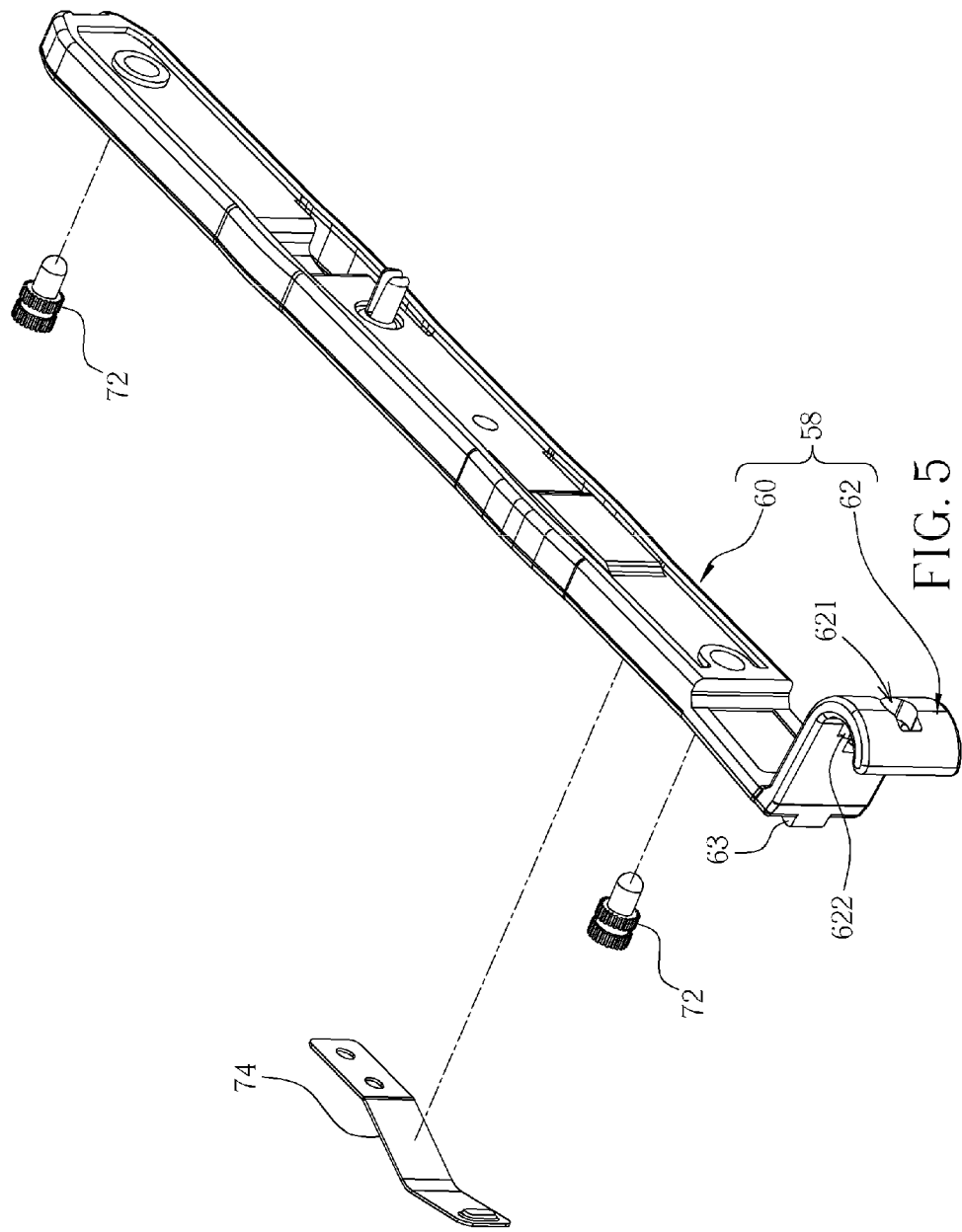
FIG. 5 is an exploded diagram of the first rail and the other components according to the preferred embodiment of the present invention.

Please refer to FIG. 3, FIG. 4, and FIG. 5. FIG. 4 is a diagram of combination of the first rail 58 and the other components according to the preferred embodiment of the present invention. FIG. 5 is an exploded diagram of the first rail 58 and the other components according to the preferred embodiment of the present invention. A first slot 621 is formed on the first handle part 62 of the first rail 58. The first slot 621 can be an arc slot. A width in the middle of the first slot 621 is larger than a width of two ends of the first slot 621. A plurality of restraining components 622 is formed on the first handle part 62 and respectively disposed on two sides of the first slot 621 for restraining movement of an end of the strap 64. The strap mechanism 56 further includes at least one positioning component 72 for positioning the first locking part 60 on the lateral surface of the electronic device 52. The positioning component 72 can be a pin. An end of the positioning component 72 is fixed on the first locking part 60. For example, a rack can be disposed on the end of the positioning component 72 so that the positioning component 72 can be fixed on the first locking part 60 firmly. The other end of the positioning component 72 is for inserting into the lateral surface of the electronic device 52 so as to combine the first locking part 60 and the electronic device 52. The strap mechanism 56 further includes at least one elastic component 74 connected to the first locking part 60 and disposed between the first locking part 60 and the cage 54. The elastic component 74 can be an elastic slice. When the electronic device 52 is disposed inside the cage 54, the elastic component 74 can be elastically deformed. Due to an elastic force provided by the elastic component 74, the electronic device 52 can be disposed inside the cage 54 tightly. In addition, the elastic component 74 can be made of metal material so as to protect the electronic device 52 from electromagnetic interference. Combination of the second rail 66 and the other components can be the same as the above-mentioned embodiment, and detailed description is omitted herein for simplicity.

Figure 6:
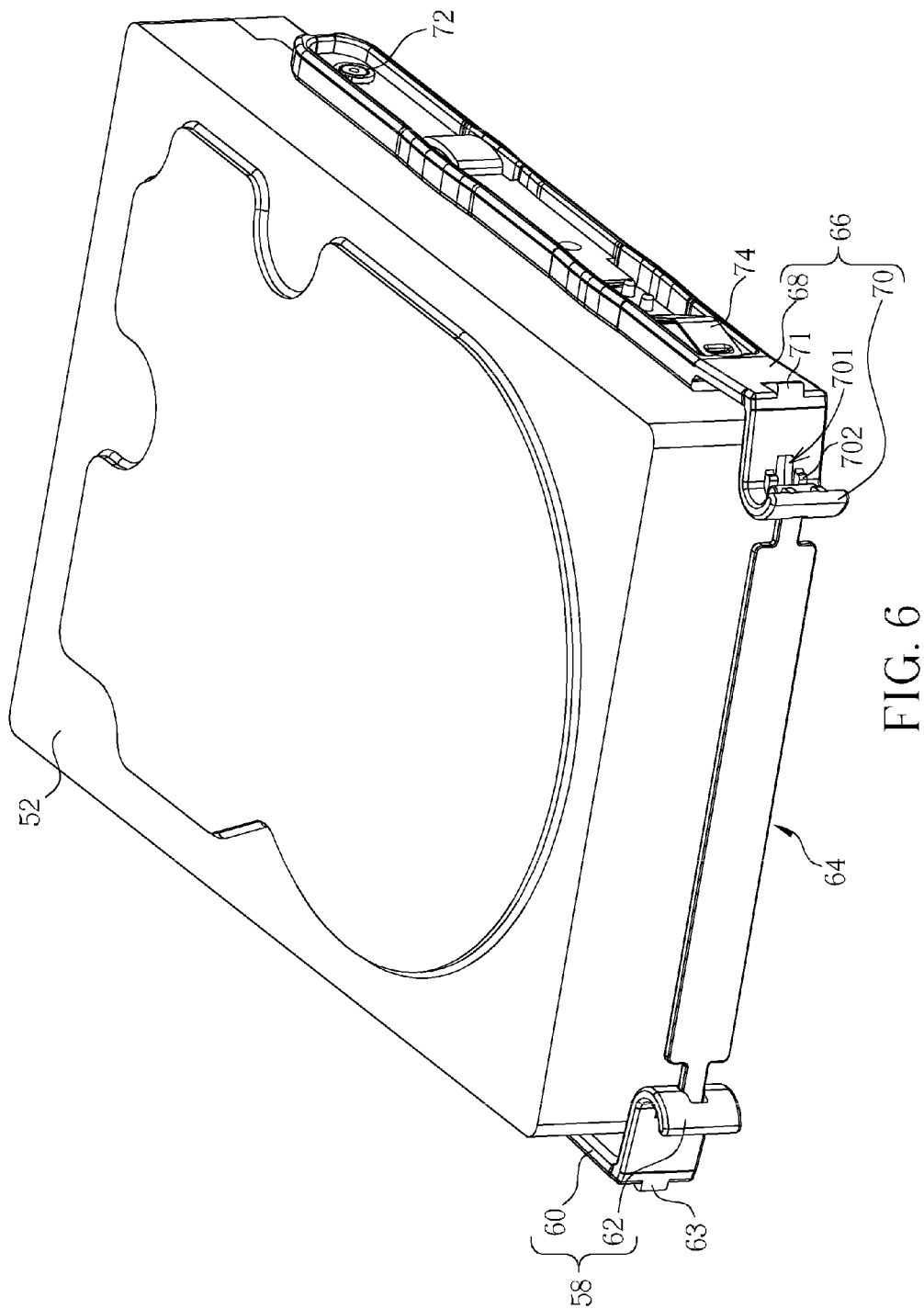
FIG. 6 is a diagram of combination of an electronic device, the first rail 58, and a second rail according to the preferred embodiment of the present invention.
Figure 7:
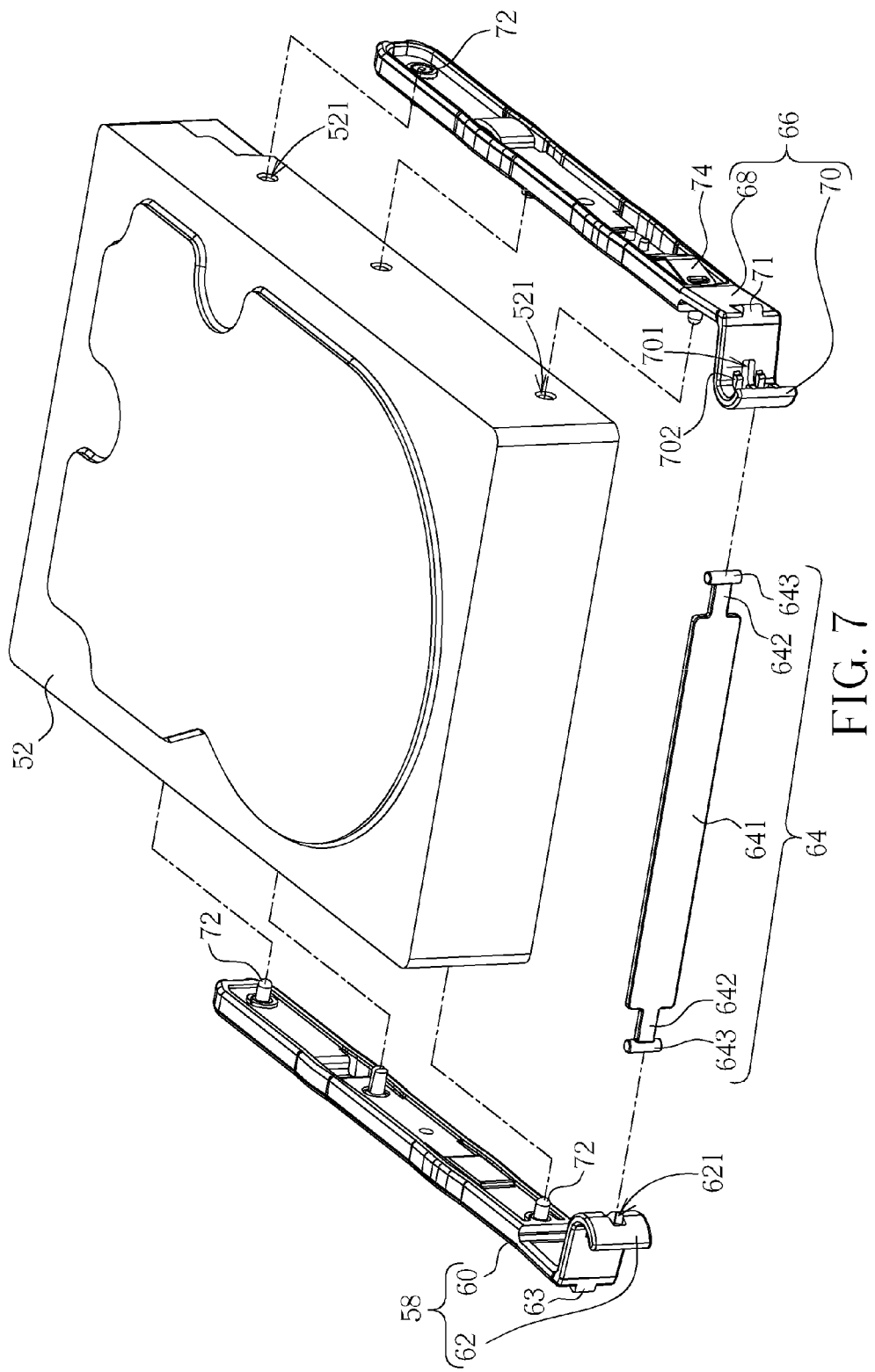
FIG. 7 is an exploded diagram of the electronic device, the first rail, and the second rail according to the preferred embodiment of the present invention.

Please refer to FIG. 6 and FIG. 7. FIG. 6 is a diagram of combination of the electronic device 52, the first rail 58, and the second rail 66 according to the preferred embodiment of the present invention. FIG. 7 is an exploded diagram of the electronic device 52, the first rail 58, and the second rail 66 according to the preferred embodiment of the present invention. At least one hole 521 is formed on two lateral surfaces of the electronic device 52. Ends of the positioning components 72 are fixed on the first locking part 60 and the second locking part 68, respectively, and the other ends of the positioning components 72 are for inserting into the holes 521 on the electronic device 52 so as to combine the first locking part 60, the second locking part 68, and the electronic device 52. A second slot 701 is formed on the second handle 70 of the second rail 66. The second slot 701 can be an arc slot. A width in the middle of the second slot 701 is larger than a width of two ends of the second slot 701. A plurality of restraining components 702 is formed on the second handle part 70 and respectively disposed on two sides of the second slot 701 for restraining movement of an end of the strap 64. The positioning component 72 is for positioning the second locking part 68 on the other lateral surface of the electronic device 52. The positioning component 72 can be a pin. An end of the positioning component 72 is fixed on the second locking part 68. For example, a rack can be disposed on the end of the positioning component 72 so that the positioning component 72 can be fixed on the second locking part 68 firmly. The other end of the positioning component 72 is for inserting into the hole 521 of the electronic device 52 so as to combine the second locking part 68 and the electronic device 52. The elastic component 74 is connected to the second locking part 68 and disposed between the second locking part 68 and the cage 54. The elastic component 74 can be an elastic slice. When the electronic device 52 is disposed inside the cage 54, the elastic component 74 connected to the first locking part 60 and the second locking part 68 can be elastically deformed. Due to the elastic force provided by the elastic component 74, the electronic device 52 can be disposed inside the cage 54 tightly. In addition, a hook 63 is formed on the first rail 58, and a hook 71 is formed on the second rail 66. When the electronic device 52 is disposed inside the cage 54, the hook 63 of the first rail 58 and the hook 71 of the second rail 66 bounce outward and insert into the openings 541 on the cage 54 due to the first rail 58 and the second rail 66 made of elastic material, so that electronic device 52 can be fixed inside the cage 54 tightly.

Figure 8:
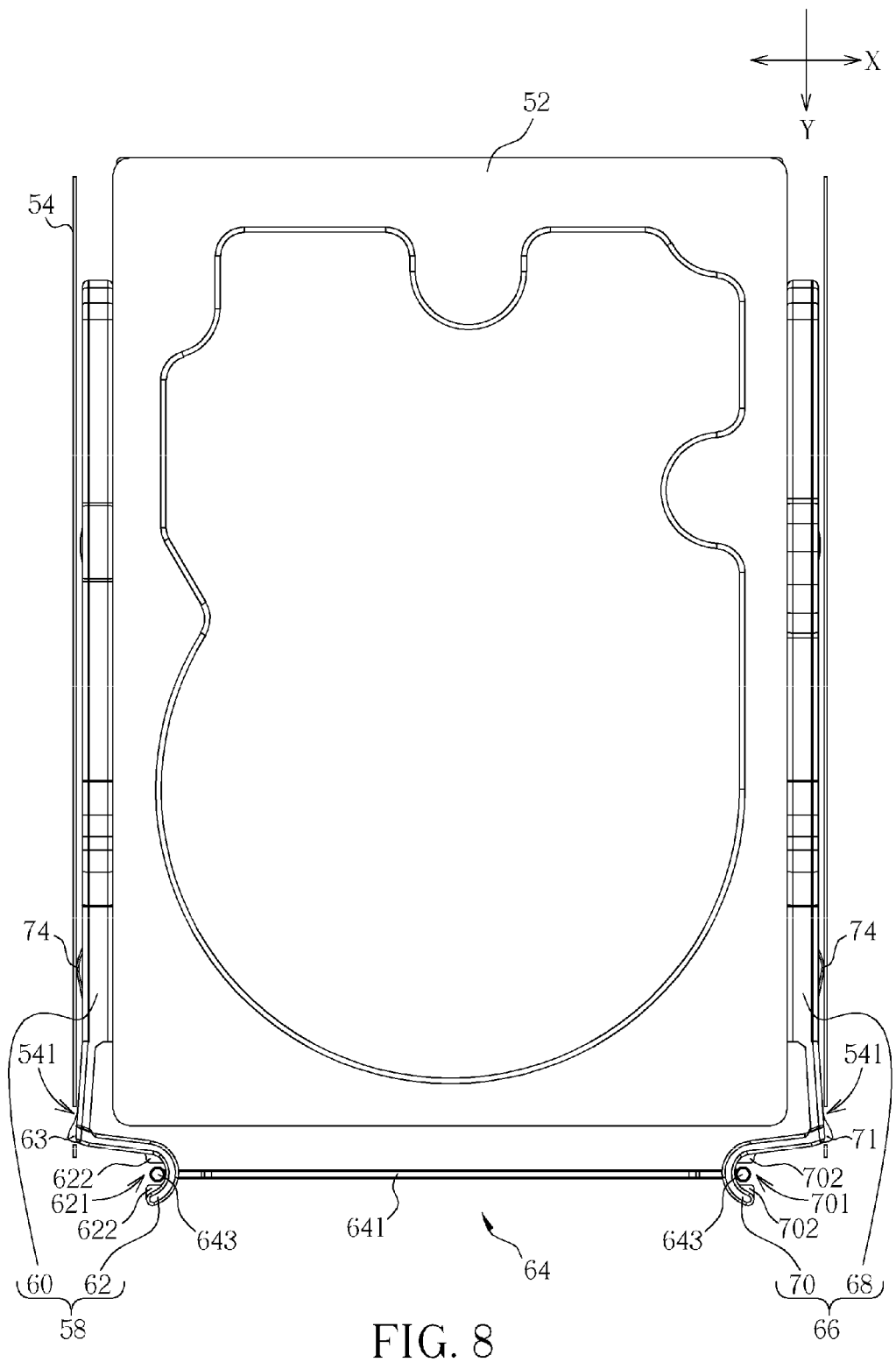
FIG. 8 is a top view of the removable storage device according to the preferred embodiment of the present invention.

Furthermore, the strap 64 includes a strap body 641, and a width of the strap body 641 is larger than each width of the first slot 621 and the second slot 701. The strap 64 further includes two passing parts 642 connected to two ends of the strap body 641 and for passing through the first slot 621 and the second slot 701 respectively, and a width of the passing part 642 is smaller than each width of the first slot 621 and the second slot 701. The strap 64 further includes two wedging parts 643 respectively connected to the passing parts 642, and a width of the wedging part 643 is larger than each width of the first slot 621 and the second slot 701 so that the strap body 641 and the wedging parts 643 are respectively installed on two sides of the first handle part 62 and the second handle part 70 when the passing parts 642 pass through the first slot 621 and the second slot 701. The strap body 641, the passing parts 642, and the wedging parts 643 can be integrated monolithically. The strap body 641, the passing parts 642, and the wedging parts 643 further can be separated components. Assembly of the strap 64, the first handle part 62, and the second handle part 70 is introduced as follows. First the strap 64 is disposed between the first handle part 62 and the second handle part 70 transversely so that two ends of the wedging parts 643 can pass through the first slot 621 and the second slot 701. Next, the strap 64 is turned from transverse placement to vertical placement. The widths in the middle of the first slot 621 and the second slot 701 are larger than the widths of the two ends of the first slot 621 and the second slot 701 so as to provide a space to rotate the passing parts 642 of the strap 64. Please refer to FIG. 8. FIG. 8 is a top view of the removable storage device 50 according to the preferred embodiment of the present invention. The wedging parts 643 are restrained between the restraining components 622 of the first handle part 62 and the restraining components 702 of the second handle part 70. That is to say, the restraining components 622 of the first handle part 62 and the restraining components 702 of the second handle part 70 restrain the two ends of the strap 64 from moving in the Y direction, respectively. Because the widths of the strap body 641 and the wedging parts 643 are larger than the widths of the first slot 621 and the second slot 701 and the widths of the passing parts 642 are smaller than the widths of the first slot 621 and the second slot 701, the strap 64 can be fixed between the first handle part 62 and the second handle part 70.

Figure 9:
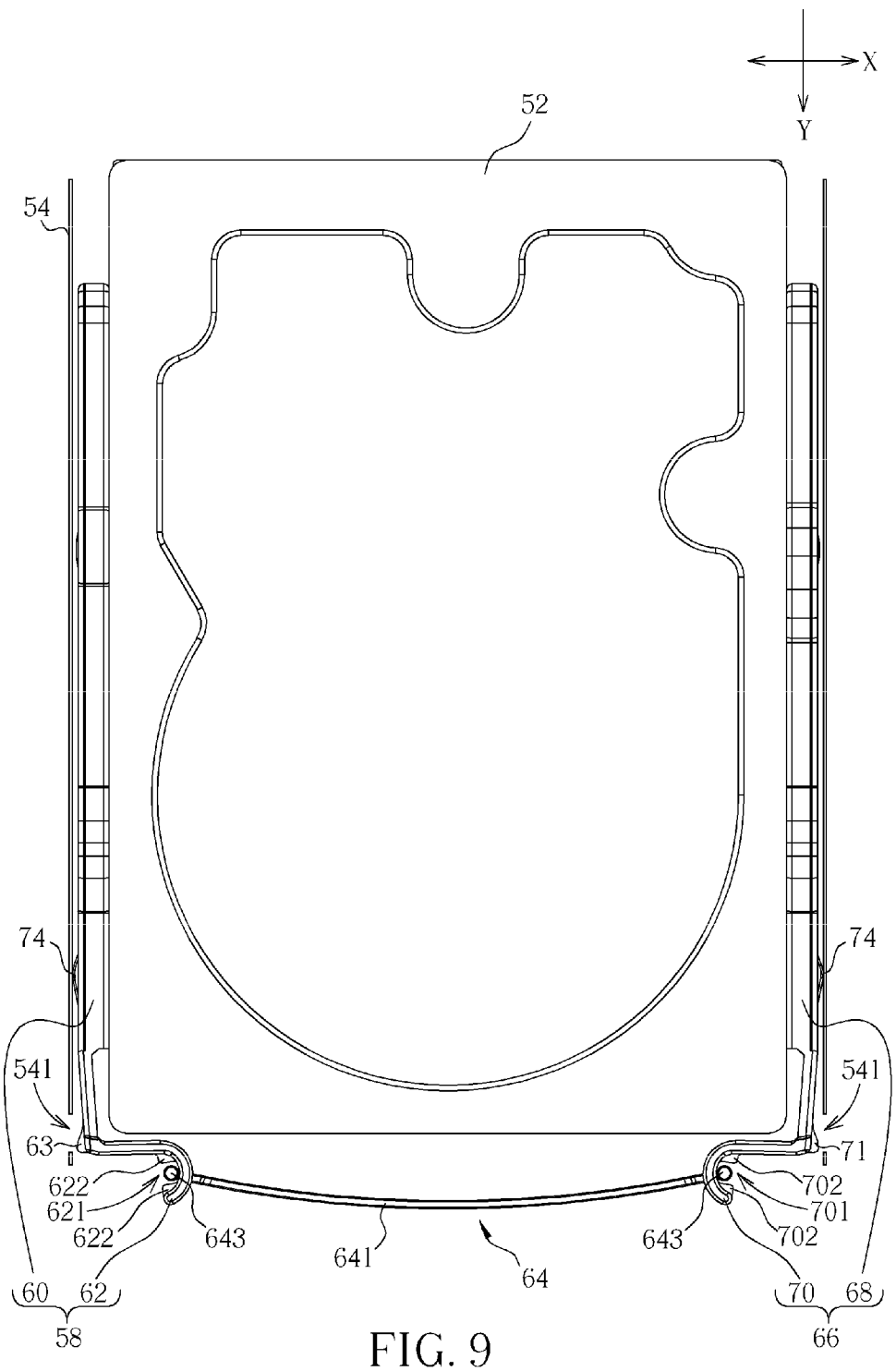
FIG. 9 is a diagram of a strap being drawn in a Y direction according to the preferred embodiment of the present invention.
Figure 10:
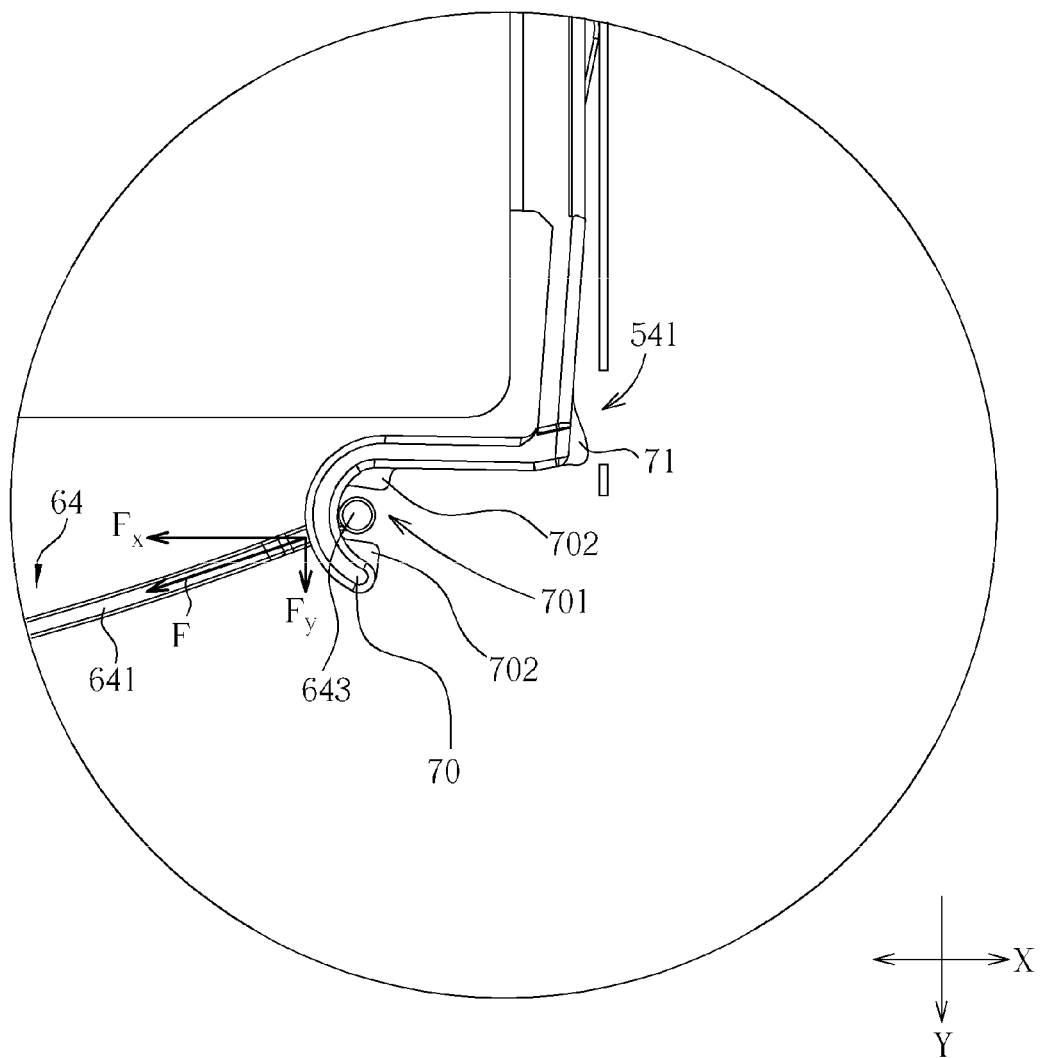
FIG. 10 is a force diagram of the strap being drawn in the Y direction according to the preferred embodiment of the present invention.

Please refer to FIG. 9 and FIG. 10. FIG. 9 is a diagram of the strap 64 being drawn in the Y direction according to the preferred embodiment of the present invention. FIG. 10 is a force diagram of the strap 64 being drawn in the Y direction according to the preferred embodiment of the present invention. Because the strap 64 is made of elastic material, the strap 64 is deformed as a curve when the middle of the strap 64 is forced toward the Y direction. The strap 64 is drawn in a direction by a force F, and the force F can be decomposed into a component force Fx in a X direction and a component force Fy in a Y direction. The X direction is perpendicular to the Y direction. The component force Fx can draw the first rail 58 and the second rail 66 close toward each other, so that the hook 63 of the first rail 58 and the hook 71 of the second rail 66 are moved inward and disengaged from the opening 541 on the cage 54. The component force Fy can pull the electronic device 52 connected to the first rail 58 and the second rail 66 out of the cage 54. Therefore, the electronic device 52 can be taken away conveniently. In addition, the restraining components 622 of the first handle part 62 and the restraining components 702 of the second handle part 70 can be designed as arc structures so as to guide the wedging parts 643 of the strap 64 to move along a track of the arc structure when being forced by the force F. It means the strap 64 is forced by the component force Fx first so as to disengage the hook 63 and the hook 71 from the opening 541 on the cage 54, and then the strap 64 is forced by the component force Fy so as to pull the electronic device 52 out of the cage 54.

Comparing to the prior art, the strap mechanism of the present invention can be assembled conveniently and the removable storage module can be removed easily. Because the strap is made of plastic material having stronger strength, a drawback of the conventional storage device that the handle is broken easily when being pressed excessively can be overcome, so as to increase the structural stability of the strap mechanism and to improve reliability of the removable storage module. Therefore, the present invention provides a strap mechanism capable of operating easily and having preferred structural strength.

Those skilled in the art will readily observe that numerous modifications and alterations of the device and method may be made while retaining the teachings of the invention.

What is claimed is:

1. A strap mechanism comprising:
   a first rail comprising:
      a first locking part for connecting with a lateral surface of an electronic device and disposed inside a cage in a slidable manner; and
      a first handle part connected to an end of the first locking part, a first slot being formed on the first handle part; and
   a strap, a first end of the strap being inserted inside the first slot, the strap being for contacting against the first handle part so as to provide a component force in a first direction and in a second direction perpendicular to the first direction to the first handle part when a deformation of the strap is generated by being pulled in the first direction, the strap comprising:
      a strap body, a width of the strap body being larger than a width of the first slot;
      a passing part connected to the strap body and for passing through the first slot, a width of the passing part being smaller than the width of the first slot, and a width in a middle of the first slot being larger than a width of two ends of the first slot so as to provide a space to rotate the passing part; and
      a wedging part connected to the passing part, a width of the wedging part being larger than the width of the first slot so that the passing part passes through the first slot and the strap body and the wedging part are respectively installed on two sides of the first handle part.

2. The strap mechanism of claim 1 further comprising:
   at least one positioning component for positioning the first locking part on the lateral surface of the electronic device.

3. The strap mechanism of claim 2, wherein the positioning component is a pin, an end of the pin is fixed on the first locking part, and another end of the pin is for inserting into a hole on the lateral surface of the electronic device.

4. The strap mechanism of claim 1 further comprising:
   an elastic component connected to the first locking part and disposed between the first locking part and the cage.

5. The strap mechanism of claim 4, wherein the elastic component is an elastic slice.

6. The strap mechanism of claim 1, wherein a plurality of restraining components is formed on the first handle part and respectively disposed on two sides of the first slot for restraining a movement of the first end of the strap.

7. The strap mechanism of claim 1, wherein a hook is formed on the first rail for engaging inside an opening on the cage, and the strap is for providing the component force in the second direction so as to separate the hook from the opening on the cage.

8. The strap mechanism of claim 1, wherein the strap is made of elastic material.

9. The strap mechanism of claim 1 further comprising:
a second rail comprising:
   a second locking part for connecting with another lateral surface of the electronic device and disposed inside the cage in the slidable manner; and
   a second handle part connected to an end of the second locking part, a second slot being formed on the second handle part;
wherein a second end of the strap is inserted inside the second slot, the strap is for contacting against the second handle part so as to provide the component force in the first direction and in the second direction perpendicular to the first direction to the second handle part when the deformation of the strap is generated by being pulled in the first direction.

10. A removable storage module comprising:
an electronic device;
a cage for holding the electronic device; and
a strap mechanism connected to the electronic device and for pulling the electronic device out of the cage in a first direction, the strap mechanism comprising:
   a first rail comprising:
      a first locking part for connecting with a lateral surface of the electronic device and disposed inside the cage in a slidable manner; and
      a first handle part connected to an end of the first locking part, a first slot being formed on the first handle part; and
   a strap, a first end of the strap being inserted inside the first slot, the strap being for contacting against the first handle part so as to provide a component force in the first direction and in a second direction perpendicular to the first direction to the first handle part when a deformation of the strap is generated by being pulled in the first direction, the strap comprising:
      a strap body, a width of the strap body being larger than a width of the first slot;
      a passing part connected to the strap body and for passing through the first slot, a width of the passing part being smaller than the width of the first slot, and a width in a middle of the first slot being larger than a width of two ends of the first slot so as to provide a space to rotate the passing part; and
      a wedging part connected to the passing part, a width of the wedging part being larger than the width of the first slot so that the passing part passes through the first slot and the strap body and the wedging part are respectively installed on two sides of the first handle part.

11. The removable storage module of claim 10, wherein the strap mechanism further comprises at least one positioning component for positioning the first locking part on the lateral surface of the electronic device.

12. The removable storage module of claim 11, wherein the positioning component is a pin, an end of the pin is fixed on the first locking part, and another end of the pin is for inserting into a hole on the lateral surface of the electronic device.

13. The removable storage module of claim 10, wherein the strap mechanism further comprises an elastic component connected to the first locking part and disposed between the first locking part and the cage.

14. The removable storage module of claim 10, wherein a plurality of restraining components is formed on the first handle part and respectively disposed on two sides of the first slot for restraining a movement of the first end of the strap.

15. The removable storage module of claim 10, wherein a hook is formed on the first rail for engaging inside an opening on the cage.

16. The removable storage module of claim 10, the strap mechanism further comprises:
a second rail comprising:
   a second locking part for connecting with another lateral surface of the electronic device and disposed inside the cage in the slidable manner; and
   a second handle part connected to an end of the second locking part, a second slot being formed on the second handle part;
wherein a second end of the strap is inserted inside the second slot, the strap is for contacting against the second handle part so as to provide the component force in the first direction and in the second direction perpendicular to the first direction to the second handle part when the deformation of the strap is generated by being pulled in the first direction.

* * * * *